US012467784B1

(12) United States Patent
Jiang et al.

(10) Patent No.: US 12,467,784 B1
(45) Date of Patent: Nov. 11, 2025

(54) HIGH-PRECISION SOLAR RESOURCE ASSESSMENT METHOD BASED ON DOWNSCALING METHOD FOR COMPLEX TERRAIN

(71) Applicant: Jiangsu Second Normal University, Nanjing (CN)

(72) Inventors: Tong Jiang, Nanjing (CN); Han Jiang, Nanjing (CN); Xikun Wei, Nanjing (CN); Cheng Jing, Nanjing (CN); Jiahui Zhang, Nanjing (CN); Jian Zhou, Nanjing (CN); Miaoni Gao, Nanjing (CN); Jinlong Huang, Nanjing (CN)

(73) Assignee: Jiangsu Second Normal University, Nanjing (CN)

( * ) Notice: Subject to any disclaimer, the term of this patent is extended or adjusted under 35 U.S.C. 154(b) by 0 days.

(21) Appl. No.: 19/196,469

(22) Filed: May 1, 2025

(30) Foreign Application Priority Data

May 7, 2024 (CN) .......................... 202410552471.7

(51) Int. Cl.
G06F 11/30 (2006.01)
G01J 1/44 (2006.01)
G01J 1/42 (2006.01)

(52) U.S. Cl.
CPC .......... G01J 1/44 (2013.01); *G01J 2001/4276* (2013.01)

(58) Field of Classification Search
CPC ........................... G01J 2001/4276; G01J 1/44
See application file for complete search history.

(56) References Cited

U.S. PATENT DOCUMENTS

| 10,692,013 B2 * | 6/2020 | Abedini | G01W 1/10 |
| 2014/0324352 A1 * | 10/2014 | Hamann | G01W 1/10 |
| | | | 702/3 |
| 2023/0177236 A1 * | 6/2023 | Yun | G06F 30/20 |
| | | | 703/6 |

FOREIGN PATENT DOCUMENTS

WO    WO-2022186765 A1 *   9/2022   .............. G01W 1/10

OTHER PUBLICATIONS

Nanjing University of Information Science and Technology (Applicant), Replacement claims (allowed) of CN202410552471.7, Jun. 14, 2024.

(Continued)

*Primary Examiner* — Phuong Huynh
(74) *Attorney, Agent, or Firm* — Hemisphere Law, PLLC; Zhigang Ma

(57) ABSTRACT

A high-precision solar resource assessment method based on a downscaling method for complex terrain includes steps as follows. Step (1): an average climatic field is calculated based on monitoring data of sunshine durations, climatic field interpolation results are obtained based on the average climatic field, and a climatic field is created. Step (2): a difference between data of the sunshine durations and the climatic field is calculated, anomaly field interpolation results are obtained based on the difference, and an anomaly field is created. Step (3): the climatic field interpolation results and the anomaly field interpolation results are overlayed. Step (4): bias adjustment is performed on the high-precision sunshine duration interpolation results obtained in the step (3) based on the monitoring data of the sunshine durations to obtain final results. Step (5): daily solar radiation is estimated based on the sunshine durations and extraterrestrial solar radiation.

4 Claims, 1 Drawing Sheet

(56) References Cited

OTHER PUBLICATIONS

CNIPA, Notification to grant patent right for invention in CN202410552471.7, Jun. 20, 2024.

* cited by examiner

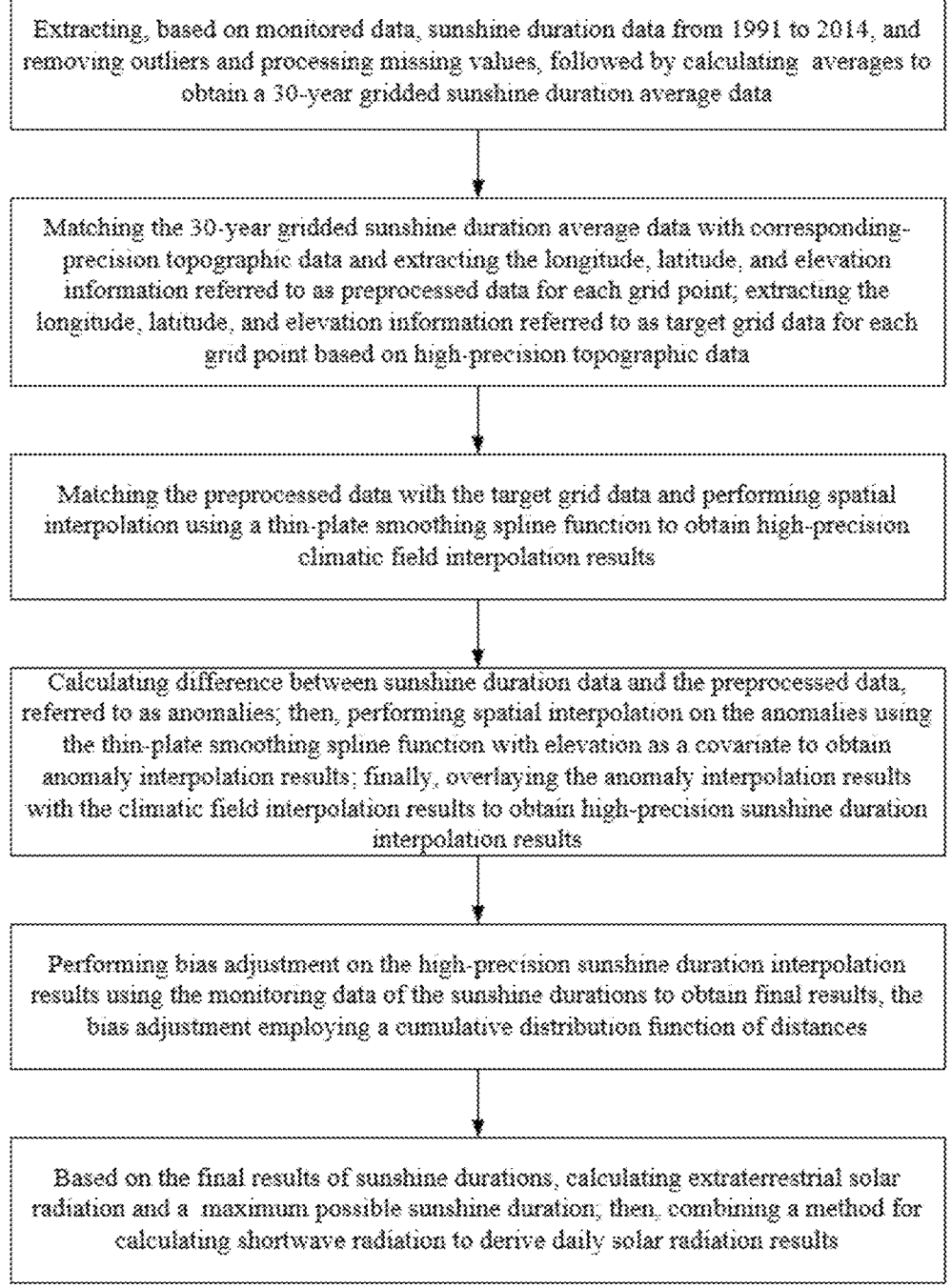

HIGH-PRECISION SOLAR RESOURCE ASSESSMENT METHOD BASED ON DOWNSCALING METHOD FOR COMPLEX TERRAIN

CROSS-REFERENCE TO RELATED APPLICATION

This application claims priority to Chinese patent application No. CN 202410552471.7, filed to China National Intellectual Property Administration (CNIPA) on May 7, 2024, which is herein incorporated by reference in its entirety.

TECHNICAL FIELD

The disclosure relates to the field of solar energy assessment technology, and particularly to a high-precision solar resource assessment method based on a downscaling method for complex terrain.

BACKGROUND

In recent years, replacement of traditional energy sources with clean energy sources has become an imperative. Solar energy resources account for a significant proportion of clean energy and have the following advantages: long-term sustainability, stable power generation time, and low operating costs. A sunshine duration and solar radiation are the most important criteria for assessing the solar energy resources. However, different latitudes and terrains can affect a length of the sunshine duration and an intensity of the solar radiation. The current assessment technologies face the following challenges: Ground meteorological stations cannot achieve full-area coverage for sunshine duration monitoring. There is a lack of sunshine duration monitoring data at different heights and with high spatial resolution, which fails to meet the requirements for solar energy resource assessment, resulting in lower accuracy of current assessment results. In addition, there is a lack of effective estimation methods for areas with limited monitoring data. The sunshine duration is affected by local altitude, and in complex terrain areas such as plateaus and mountains, the assessment of solar energy resources is more difficult.

SUMMARY

The purpose of the disclosure is to provide a high-precision solar resource assessment method based on a downscaling method for complex terrain. On the one hand, it solves the problem of the lack of ground stations or observation data accuracy that cannot meet the requirements, resulting in the inability to predict solar radiation on a large scale and with high accuracy. On the other hand, it solves the difficulty of solar radiation assessment caused by complex terrain and large altitude changes.

The high-precision solar resource assessment method based on a downscaling method for complex terrain includes step (1) to step (5) as follows.

Step (1): an average climatic field of a region with high altitude and complex terrain is calculated based on monitoring data of sunshine durations in the region, climatic field interpolation results are obtained based on the average climatic field, and a climatic field that meet the requirements is created based on the climatic field interpolation results.

Step (2): a difference between data of the sunshine durations and the climatic field is calculated, anomaly field interpolation results are obtained based on the difference, and an anomaly field is created based on the anomaly field interpolation results. The data of the sunshine durations in the region includes the monitoring data of the sunshine durations and mode data. The mode data includes 37 models from the sixth phase of the Coupled Model Intercomparison Project (CMIP6).

Step (3): the climatic field interpolation results and the anomaly field interpolation results are overlayed.

Step (4): bias adjustment is performed on the high-precision sunshine duration interpolation results obtained in the step (3) based on the monitoring data of the sunshine durations to obtain final results (i.e., adjusted high-precision sunshine duration interpolation results).

Step (5): daily solar radiation of the region is estimated based on the sunshine durations and extraterrestrial solar radiation. The extraterrestrial solar radiation is calculated based on the final results.

Step (6): the daily solar radiation obtained from the step (5) is converted as multi-scale cumulative solar radiation for years in the region, and then the solar energy resource assessment is performed by using the multi-scale cumulative solar radiation to obtain solar energy resource results in the region. In respond to the solar energy resource result exceeding a target energy demand in the region, an optimal location of the solar power plant in the region is determined, then the solar power plant is established in the optimal location. In respond to the solar energy resource result being less than the target energy demand in the region, an optimal location of the solar power plant in the region is determined, and optimal system capacity of the solar power plant is determined based on the solar energy resource results to ensure stable power supply during a period of scarce solar energy resources, then the solar power plant with the optimal system capacity is established in the optimal location.

In an embodiment, the step (1) includes steps as follows.

The spatial interpolation is performed on the average climatic field by using the thin-plate smoothing spline function with elevation as the covariate to obtain the climatic field interpolation results. Precision of the spatial interpolation on the average climatic field is consistent with precision required for the solar resource assessment, the data of the sunshine durations for the climatic field is obtained from daily average sunshine durations monitored over a period of thirty years, and the precision required for the solar resource assessment is in a range of 1 kilometer (km) to 25 km.

In an embodiment, the step (2) includes steps as follows.

The spatial interpolation is performed on an anomaly value by using a thin-plate smoothing spline function with the elevation as a covariate to obtain the anomaly field interpolation results. The precision of a spatial interpolation is consistent with the precision required for the solar resource assessment, and the difference between the data of the sunshine durations and the climatic field is the anomaly value.

In an embodiment, the step (3) includes steps as follows.

The climatic field interpolation results and the anomaly field interpolation results with consistent spatial resolutions are overlayed to obtain high-precision sunshine duration interpolation results.

In an embodiment, the step (4) includes steps as follows.

The bias adjustment is performed on the high-precision sunshine duration interpolation results and the anomaly field interpolation results by using a distance cumulative distribution function method.

In an embodiment, the step (5) includes a formula for estimating the daily solar radiation is expressed as follows:

$$SR_{short} = \left(0.25 + \frac{\text{Hour}_1}{2\text{Hour}_2}\right) \cdot SR_{extra}$$

where $SR_{short}$ represents shortwave radiation, and the shortwave radiation is used to assess a solar resource, in units of mega joules per square meter (MJ/m$^2$); $SR_{extra}$ represents the extraterrestrial solar radiation, in units of MJ/m$^2$; Hour$_1$ represents an actual sunshine duration on a day, in units of hours (h); and Hour$_2$ represents a maximum possible sunshine duration on a day, in units of h, the maximum possible sunshine duration on a day is calculated based on the final results.

A formula of the maximum possible sunshine duration on the day is expressed as follows:

$$\text{Hour}_2 = \frac{24 \cdot Sundip_1}{\pi}$$

where $Sundip_1$ represents a sunset hour angle, in units of radians (rad).

A formula of the sunset hour angle is expressed as follows:

$$Sundip_1 = \arccos(-\tan(Lat) \cdot \tan(Sundip_2))$$

where Lat represents a latitude, in units of rad; and $Sundip_2$ represents a solar declination angle, in units of rad.

A formula of the solar declination angle is expressed as follows:

$$Sundip_2 = 0.409 \cdot \sin\left(2 \cdot \pi \cdot \frac{\text{Date}_1}{\text{Date}_2} - 1.39\right)$$

where Date$_1$ represents a day of a year (also referred to as Julian day), which is an ordinal number of the day in the year; and Date$_2$ represents a total number of days of the year, which is 365 for a common year, or 366 for a leap year.

A formula of the extraterrestrial solar radiation $SR_{extra}$ is expressed as follows:

$$SR_{extra} = 118.08 \frac{\text{Distance}}{\pi} \cdot$$
$$(Sundip_1 \cdot \sin(Lat) \cdot \sin(Sundip_2) + \cos(Lat) \cdot \cos(Sundip_2) \cdot \sin(Sundip_2))$$

where $SR_{extra}$ represents the extraterrestrial solar radiation, in units of MJ/m$^2$; Lat represents a latitude, in units of rad; $Sundip_1$ represents a sunset hour angle, in units of rad; $Sundip_2$ represents a solar declination angle, in units of rad; and Distance represents a relative Sun-Earth distance, in units of astronomical units (AU).

A formula of the relative Sun-Earth distance is expressed as follows:

$$\text{Distance} = 1 + 0.33 \cdot \cos\left(\frac{2 \cdot \pi \cdot \text{Date}_1}{\text{Date}_2}\right)$$

where Date$_1$ represents a day of a year, which is an ordinal number of the day in the year; and Date$_2$ represents a total number of days of the year, which is 365 for a common year, or 366 for a leap year.

The beneficial effects of the disclosure are as follows.

Compared with the related art, the disclosure has the following significant advantages. The disclosure can effectively enhance the precision and accuracy of sunshine durations and solar radiation data, which has lower error, can effectively reduce the error brought by large-scale, low-spatial resolution data. Spatial distribution of the disclosure is good, which effectively enhances the spatial continuity of sunshine durations and solar radiation and improves the spatial distribution of data. The disclosure is widely applicable, which enables the estimation of solar radiation under various terrain conditions and different latitude distributions.

BRIEF DESCRIPTION OF DRAWING

FIGURE illustrates a schematic flow chart of a high-precision solar resource assessment method based on a downscaling method for complex terrain according to an embodiment of the disclosure.

DETAILED DESCRIPTION OF EMBODIMENTS

The technical solution of the disclosure will be further explained in conjunction with the attached drawing.

As shown in FIGURE, a high-precision solar resource assessment method based on a downscaling method for complex terrain includes step (1) to step (5) as follows.

Step (1): an average climatic field is calculated based on monitoring data of sunshine durations, climatic field interpolation results are obtained based on the average climatic field, and a climatic field is created based on the climatic field interpolation results. Specifically, the spatial interpolation is performed on the average climatic field by using the thin-plate smoothing spline function with elevation as the covariate to obtain the climatic field interpolation results. Precision of the spatial interpolation on the average climatic field is consistent with precision required for the solar resource assessment, the monitoring data of the sunshine durations for the climatic field is obtained from daily average sunshine durations monitored over a period of thirty years (i.e., 30-year gridded sunshine duration average data), and the precision required for the solar resource assessment is in a range of 1 kilometer (km) to 25 km.

Step (2): a difference between the monitoring data of the sunshine durations and the climatic field is calculated, anomaly field interpolation results are obtained based on the difference, and an anomaly field is created based on the anomaly field interpolation results. Specifically, the spatial interpolation is performed on an anomaly value by using a thin-plate smoothing spline function with the elevation as a covariate to obtain the anomaly field interpolation results. The precision of a spatial interpolation is consistent with the precision required for the solar resource assessment, and the difference between the data of the sunshine durations and the climatic field is the anomaly value.

Step (3): the climatic field interpolation results and the anomaly field interpolation results are overlayed. Specifically, the climatic field interpolation results and the anomaly field interpolation results with consistent spatial resolutions are overlayed to obtain high-precision sunshine duration interpolation results.

Step (4): bias adjustment is performed on the high-precision sunshine duration interpolation results obtained in the step (3) based on the monitoring data of the sunshine durations to obtain final results. Specifically, the bias adjustment is performed on the high-precision sunshine duration interpolation results and the anomaly field interpolation results by using a distance cumulative distribution function method.

Step (5): daily solar radiation is estimated based on the sunshine durations and extraterrestrial solar radiation. Specifically, the step (5) includes a formula for estimating the daily solar radiation is expressed as follows:

$$SR_{short} = \left(0.25 + \frac{\text{Hour}_1}{2\text{Hour}_2}\right) \cdot SR_{extra}$$

where $SR_{short}$ represents shortwave radiation, and the shortwave radiation is used to assess a solar resource, in units of mega joules per square meter (MJ/m$^2$); $SR_{extra}$ represents the extraterrestrial solar radiation, in units of MJ/m$^2$; Hour$_1$ represents an actual sunshine duration on a day, in units of hours (h); and Hour$_2$ represents a maximum possible sunshine duration on a day, in units of h.

A formula of the maximum possible sunshine duration on the day is expressed as follows:

$$\text{Hour}_2 = \frac{24 \cdot Sundip_1}{\pi}$$

where $Sundip_1$ represents a sunset hour angle, in units of radians (rad).

A formula of the sunset hour angle is expressed as follows:

$$Sundip_1 = \arccos(-\tan(Lat) \cdot \tan(Sundip_2))$$

where Lat represents a latitude, in units of rad; and $Sundip_2$ represents a solar declination angle, in units of rad.

A formula of the solar declination angle is expressed as follows:

$$Sundip_2 = 0.409 \cdot \sin\left(2 \cdot \pi \cdot \frac{Date_1}{Date_2} - 1.39\right)$$

where $Date_1$ represents a day of a year, which is an ordinal number of the day in the year; and $Date_2$ represents a total number of days of the year, which is 365 for a common year, or 366 for a leap year.

A formula of the extraterrestrial solar radiation $SR_{extra}$ is expressed as follows:

$$SR_{extra} = 118.08 \cdot \frac{\text{Distance}}{\pi} \cdot$$
$$(Sundip_1 \cdot \sin(Lat) \cdot \sin(Sundip_2) + \cos(Lat) \cdot \cos(Sundip_2) \cdot \sin(Sundip_2))$$

where $SR_{extra}$ represents the extraterrestrial solar radiation, in units of MJ/m$^2$; Lat represents a latitude, in units of rad; $Sundip_1$ represents a sunset hour angle, in units of rad; $Sundip_2$ represents a solar declination angle, in units of rad; and Distance represents a relative Sun-Earth distance, in units of astronomical units (AU).

A formula of the relative Sun-Earth distance is expressed as follows:

$$\text{Distance} = 1 + 0.33 \cdot \cos\left(\frac{2 \cdot \pi \cdot Date_1}{Date_2}\right)$$

where $Date_1$ represents a day of a year, which is an ordinal number of the day in the year; and $Date_2$ represents a total number of days of the year, which is 365 for a common year, or 366 for a leap year.

What is claimed is:

1. A high-precision solar resource assessment method based on a downscaling method for complex terrain, comprising:

step (1), calculating an average climatic field based on monitoring data of sunshine durations, obtaining, based on the average climatic field, climatic field interpolation results, and creating a climatic field based on the climatic field interpolation results;

step (2), calculating a difference between data of the sunshine durations and the climatic field, obtaining, based on the difference, anomaly field interpolation results, and creating an anomaly field based on the anomaly field interpolation results, comprising:

performing, by using a thin-plate smoothing spline function with an elevation as a covariate, spatial interpolation on an anomaly value to obtain the anomaly field interpolation results, wherein a precision of the spatial interpolation is consistent with a precision required for solar resource assessment, and the difference between the data of the sunshine durations and the climatic field is the anomaly value;

step (3), overlaying the climatic field interpolation results and the anomaly field interpolation results, comprising:

overlaying the climatic field interpolation results and the anomaly field interpolation results with consistent spatial resolutions to obtain high-precision sunshine duration interpolation results;

step (4), performing bias adjustment on the high-precision sunshine duration interpolation results obtained in the step (3) based on the monitoring data of the sunshine durations to obtain final results;

step (5), estimating daily solar radiation based on the sunshine durations and extraterrestrial solar radiation, wherein a formula for estimating the daily solar radiation is expressed as follows:

$$SR_{short} = \left(0.25 + \frac{\text{Hour}_1}{2\text{Hour}_2}\right) \cdot SR_{extra}$$

where $SR_{short}$ represents shortwave radiation, and the shortwave radiation is used to assess a solar resource, in units of mega joules per square meter (MJ/m$^2$); $SR_{extra}$ represents the extraterrestrial solar radiation, in units of MJ/m$^2$; Hour$_1$ represents an actual sunshine duration on a day, in units of hours (h); and Hour$_2$ represents a maximum possible sunshine duration on a day, in units of h, and a formula of the maximum possible sunshine duration on the day is expressed as follows:

$$\text{Hour}_2 = \frac{24 \cdot Sundip_1}{\pi}$$

where $Sundip_1$ represents a sunset hour angle, in units of radians (rad), and a formula of the sunset hour angle is expressed as follows:

$$Sundip_1 = \arccos(-\tan(Lat) \cdot \tan(Sundip_2))$$

where Lat represents a latitude, in units of rad; and $Sundip_2$ represents a solar declination angle, in units of rad, and a formula of the solar declination angle is expressed as follows:

$$Sundip_2 = 0.409 \cdot \sin\left(2 \cdot \pi \cdot \frac{Date_1}{Date_2} - 1.39\right)$$

where $Date_1$ represents a day of a year, which is an ordinal number of the day in the year; and $Date_2$ represents a total number of days of the year, which is 365 for a common year, or 366 for a leap year; and wherein a formula of the extraterrestrial solar radiation $SR_{extra}$ is expressed as follows:

$$SR_{extra} = 118.08 \cdot \frac{Distance}{\pi} \cdot$$
$$(Sundip_1 \cdot \sin(Lat) \cdot \sin(Sundip_2) + \cos(Lat) \cdot \cos(Sundip_2) \cdot \sin(Sundip_2))$$

where $SR_{extra}$ represents the extraterrestrial solar radiation, in units of MJ/m²; Lat represents a latitude, in units of rad; $Sundip_1$ represents a sunset hour angle, in units of rad; $Sundip_2$ represents a solar declination angle, in units of rad; and Distance represents a relative Sun-Earth distance, in units of astronomical units (AU), and a formula of the relative Sun-Earth distance is expressed as follows:

$$Distance = 1 + 0.33 \cdot \cos\left(\frac{2 \cdot \pi \cdot Date_1}{Date_2}\right)$$

where $Date_1$ represents a day of a year, which is an ordinal number of the day in the year; and $Date_2$ represents a total number of days of the year, which is 365 for a common year, or 366 for a leap year; and step (6), converting the daily solar radiation obtained from the step (5) as multi-scale cumulative solar radiation for years in a target region, and then performing, using the multi-scale cumulative solar radiation, solar energy resource assessment to obtain a solar energy resource result in the target region; in respond to the solar energy resource result exceeding a target energy demand in the target region, determining an optimal location of a solar power plant in the target region, then establishing the solar power plant in the optimal location; in respond to the solar energy resource result being less than the target energy demand in the target region, determining the optimal location of the solar power plant in the target region, and determining optimal system capacity of the solar power plant based on the solar energy resource result to ensure stable power supply during a period of scarce solar energy resources, then establishing the solar power plant with the optimal system capacity in the optimal location.

2. The high-precision solar resource assessment method based on the downscaling method for complex terrain as claimed in claim 1, wherein the step (1) comprises:

performing, using the thin-plate smoothing spline function with the elevation as the covariate, spatial interpolation on the average climatic field to obtain the climatic field interpolation results, wherein the precision of the spatial interpolation on the average climatic field is consistent with the precision required for the solar resource assessment, the data of the sunshine durations for the climatic field is obtained from an average sunshine duration monitored over a period of thirty years, and the precision required for the solar resource assessment is in a range of 1 kilometer (km) to 25 km.

3. The high-precision solar resource assessment method based on the downscaling method for complex terrain as claimed in claim 1, wherein the step (4) comprises:

performing, by using a distance cumulative distribution function method, the bias adjustment on the high-precision sunshine duration interpolation results and the anomaly field interpolation results.

4. A high-precision solar resource assessment method based on a downscaling method for complex terrain, comprising:

step (1), calculating an average climatic field based on monitoring data of sunshine durations, obtaining, based on the average climatic field, climatic field interpolation results, and creating a climatic field based on the climatic field interpolation results;

step (2), calculating a difference between data of the sunshine durations and the climatic field, obtaining, based on the difference, anomaly field interpolation results, and creating an anomaly field based on the anomaly field interpolation results, comprising:

performing, by using a thin-plate smoothing spline function with an elevation as a covariate, spatial interpolation on an anomaly value to obtain the anomaly field interpolation results, wherein a precision of the spatial interpolation is consistent with a precision required for solar resource assessment, and the difference between the data of the sunshine durations and the climatic field is the anomaly value;

step (3), overlaying the climatic field interpolation results and the anomaly field interpolation results, comprising:

overlaying the climatic field interpolation results and the anomaly field interpolation results with consistent spatial resolutions to obtain high-precision sunshine duration interpolation results;

step (4), performing bias adjustment on the high-precision sunshine duration interpolation results obtained in the step (3) based on the monitoring data of the sunshine durations to obtain final results;

step (5), estimating daily solar radiation based on the sunshine durations and extraterrestrial solar radiation, wherein a formula for estimating the daily solar radiation is expressed as follows:

$$SR_{short} = \left(0.25 + \frac{Hour_1}{2Hour_2}\right) \cdot SR_{extra}$$

where $SR_{short}$ represents shortwave radiation, and the shortwave radiation is used to assess a solar resource, in units of MJ/m$^2$; $SR_{extra}$ represents the extraterrestrial solar radiation, in units of MJ/m$^2$; Hour$_1$ represents an actual sunshine duration on a day, in units of h; and Hour$_2$ represents a maximum possible sunshine duration on a day, in units of h, and a formula of the maximum possible sunshine duration on the day is expressed as follows:

$$\text{Hour}_2 = \frac{24 \cdot Sundip_1}{\pi}$$

where $Sundip_1$ represents a sunset hour angle, in units of rad, and a formula of the sunset hour angle is expressed as follows:

$Sundip_1 = \arccos(-\tan(Lat) \cdot \tan(Sundip_2))$ where Lat represents a latitude, in units of rad; and $Sundip_2$ represents a solar declination angle, in units of rad, and a formula of the solar declination angle is expressed as follows:

$$Sundip_2 = 0.409 \cdot \sin\left(2 \cdot \pi \cdot \frac{Date_1}{Date_2} - 1.39\right)$$

where Date$_1$ represents a day of a year, which is an ordinal number of the day in the year; and Date$_2$ represents a total number of days of the year, which is 365 for a common year, or 366 for a leap year; and wherein a formula of the extraterrestrial solar radiation $SR_{extra}$ is expressed as follows:

$$SR_{extra} = 118.08 \cdot \frac{\text{Distance}}{\pi} \cdot$$
$$(Sundip_1 \cdot \sin(Lat) \cdot \sin(Sundip_2) + \cos(Lat) \cdot \cos(Sundip_2) \cdot \sin(Sundip_2))$$

where $SR_{extra}$ represents the extraterrestrial solar radiation, in units of MJ/m$^2$; Lat represents a latitude, in units of rad; $Sundip_1$ represents a sunset hour angle, in units of rad; $Sundip_2$ represents a solar declination angle, in units of rad; and Distance represents a relative Sun-Earth distance, in units of AU, and a formula of the relative Sun-Earth distance is expressed as follows:

$$\text{Distance} = 1 + 0.33 \cdot \cos\left(\frac{2 \cdot \pi \cdot Date_1}{Date_2}\right)$$

where Date$_1$ represents a day of a year, which is an ordinal number of the day in the year; and Date$_2$ represents a total number of days of the year, which is 365 for a common year, or 366 for a leap year; and step (6), converting the daily solar radiation obtained from the step (5) into multi-scale cumulative solar radiation for years in a target region, and then performing, using the multi-scale cumulative solar radiation, solar energy resource assessment to obtain a solar energy resource result in the target region; and in respond to the solar energy resource result exceeding a target energy demand in the target region, determining an optimal location of a solar power plant in the target region, and then establishing the solar power plant in the optimal location.

\* \* \* \* \*